United States Patent [19]
Rooney

[11] 3,856,050
[45] Dec. 24, 1974

[54] FLANGE PROTECTOR
[76] Inventor: Thomas M. Rooney, 1815 Bristol Cove, Plano, Tex. 75074
[22] Filed: Dec. 18, 1972
[21] Appl. No.: 315,859

[52] U.S. Cl. .......................... 138/96 R, 85/DIG. 2
[51] Int. Cl. ...................... B65d 59/00, F16l 57/00
[58] Field of Search ................. 138/89, 96 R, 96 T; 85/5 R, DIG. 2; 285/379, 380; 24/208 A, 214

[56] References Cited
UNITED STATES PATENTS
| | | | |
|---|---|---|---|
| 2,585,438 | 2/1952 | Clingman | 85/DIG. 2 |
| 2,896,889 | 7/1959 | Hershberger et al. | 85/DIG. 2 |
| 3,563,277 | 2/1971 | Klipper | 138/96 R |

Primary Examiner—Charles A. Ruehl
Attorney, Agent, or Firm—Richards, Harris & Medlock

[57] ABSTRACT

A flange protector is provided for attachment to a machined surface of a flanged end of a pipe, valve, or the like. The flange protector has a plate of flexible material having an outline substantially similar to the outline of the machined portion of the flange to be protected. A plurality of elongated connector means with bulbous portions on the ends thereof are integrally molded with the plate to extend transversely therefrom. These connector means correspond in spacing with bolt openings in the flange. The bulbous portions are of a size and shape to engage the bolt openings to hold the protector in position on the flange.

12 Claims, 5 Drawing Figures

PATENTED DEC 24 1974 3,856,050

FLANGE PROTECTOR

BACKGROUND OF THE INVENTION

The present invention relates to flange protectors for attachment to a machined surface of a flange on a pipe, valve, or the like, and more particularly to an improved flange protector which is constructed from resilient material and covers the machined surface to protect the same from damage. The protector has fasteners which provide a positive lock means, for attaching the protector in position by engaging the bolt openings in the flange.

Large fluid handling devices, such as pipes, valves, meters, pumps, and the like customarily have flanges on the ends thereof. These flanges often have machined surfaces thereon with a plurality of bolt openings therethrough for use in attaching adjacent devices together. In the manufacture, transport and installation of these devices, it has been a general practice in the industry to employ flange protectors to protect the machined surface of the flange from damage. Generally, these protectors take the form of a rigid sheet of plywood, masonite, or the like having a plurality of holes disposed about the sheet. These holes are aligned with correspondingly disposed bolt openings in the flange, and nut and bolt assemblies are inserted through each of the holes in the sheet and the bolt openings in the flange to fasten the sheet in place.

Although, these protectors have served to protect the machined surfaces on the flanges, they have not proved entirely satisfactory under all conditions of service for the reason that considerable difficulty has been encountered in attaching and detaching the protectors. This is due to the fact that the installation and removal of threaded fasteners commonly requires the use of tools such as wrenches, or the like, and that a sufficient clearance space around the flange in which to use a wrench is not always present. In addition, in some environments, the reduction of installation time is very important, and therefore the slow process of removing nut and bolt assemblies is a decided disadvantage.

SUMMARY OF THE INVENTION

The general purpose of the present invention is to provide an improved flange protector which is strong and durable, yet is simple to install and remove. The improved flange protector of the present invention comprises a molded plate of flexible material which has a shape which corresponds with the shape of the flange to be protected. The plate has a plurality of transversely extending connector means integrally molded thereon. Each of the connector means is of a size which can be compressed to pass through bolt openings in the flange and will return to their original shape to provide a positive lock to hold the flange protector in position once the connector means are inserted through the bolt openings.

Accordingly, one of the primary objects of the present invention is the provision of an improved flange protector.

Another object of the present invention is the provision of an improved flange protector which has a unitary construction.

A further object of the present invention is the provision of a flange protector with improved connector means thereon.

Another object of the present invention is the provision of an improved flange protector which is simple and inexpensive to manufacture and install.

Other objects and many of the attendant advantages of this invention will be readily appreciated by those of ordinary skill in the art as the same becomes better understood by reference to the following Detailed Description when considered in connection with the accompanying Drawings in which:

DESCRIPTION OF THE PREFERRED EMBODIMENT

Figure 1:
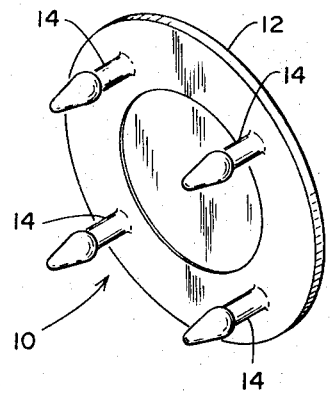
FIG. 1 is a perspective view of one embodiment of the improved flange protector of the present invention illustrating the side which contacts the machined surface and the releasable attachment means for holding the protector in place.

Referring now to the Drawings, wherein like reference characters designate like or corresponding parts throughout the several views, there is shown an embodiment of the improved flange protector of the present invention, which for purposes of description is identified by reference numeral 10. The flange protector 10 is provided with a flat circular plate 12 which in the present embodiment is provided with four connector means 14 which extend from one side thereof. As will be hereinafter described, these connector means 14 are used to hold the protector 10 in place on the flange by engaging bolt opening therein. It is therefore to be understood that more or less than four connector means 14 could be provided as required by the particular flange configuration.

In the present embodiment the flange protector 10 is molded from any thermoplastic or thermosetting material, or the like. The group of materials used within the scope of this invention includes reclaimed synthetic rubber, polyethylene and polystyrene. The flange protector 10 shown, is circular in shape to conform with the circular flange 18. It is to be understood, of course, that flanges of different shapes could be protected by flange protectors made in accordance with teachings of the present invention by forming the plates 12 in different shapes and providing a different number of connector means 14 as is required to protect any size diameter flange.

Figure 2:
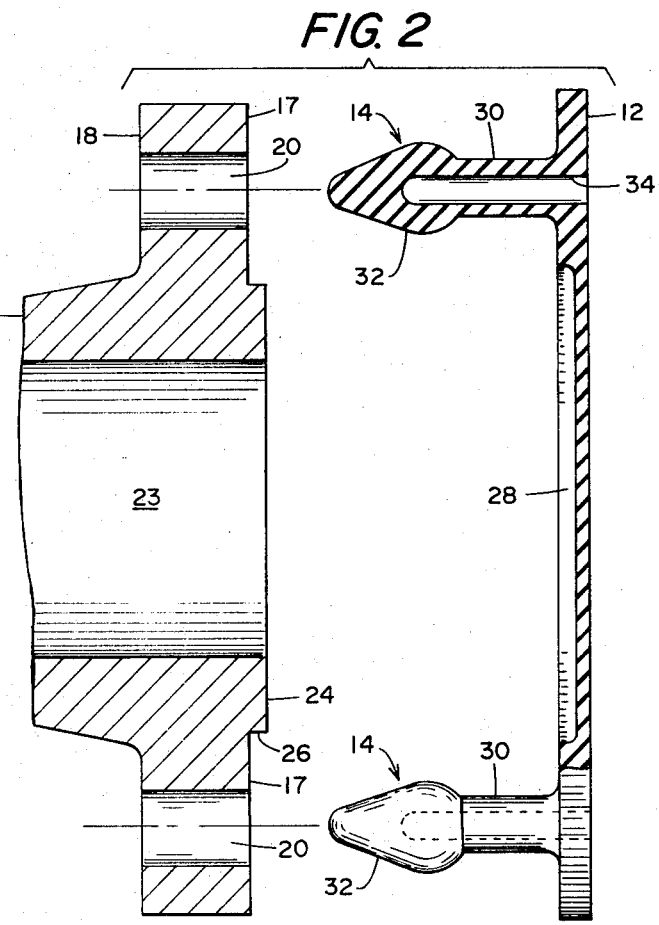
FIG. 2 is an exploded partial section of the flange protector of FIG. 1 shown adjacent to a typical flange of a pipe or valve section.

In FIG. 2, a pipe or valve section 16 is illustrated with flange 18 formed thereon. This flange 18 has an annular machined surface 17 with four circumferentially spaced bolt apertures 20 therethrough. In the embodiment shown, the flange 18 is shown with a raised second annular machined surface 24 adjacent the flow passage 23. This surface 24 is parallel to surface 17 and is separated therefrom by a cylindrical shoulder 26.

The connector means 14 are positioned on the plate 12 to align with the bolt apertures 20 in the flange 18. In the present embodiment, the plate 12 is provided with a cylindrical counter bore or cavity 28 of a size and shape to fit over the shoulder 26 and surface 24. It is to be realized that flange shapes vary widely. For example, some flanges have flat faces, sunken faces, or raised faces as illustrated herein. To accommodate these variations, the plate 12 can be molded with a flat surface, an extending surface, or as in the present embodiment with a cavity 28.

Figure 4:
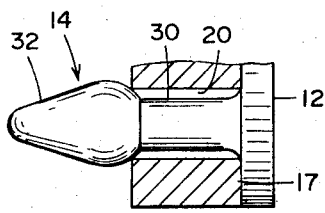
FIG. 4 is a view similar to FIG. 3 illustrating the attachment means completely inserted through a bolt opening.

The connectors 14 are each provided with a cylindrical first portion 30 and a bulbous-shaped head portion 32. As can be seen in FIG. 4, the portion 30 is of such a length that one end of the head portion 32 will rest against the flange 18 to hold the protector 10 in place.

The head portion 32 has a maximum diameter which is selected to be greater than the diameter of the respective aperture 20. By designing the head portion 32 so that it is sufficiently compressible to pass through the aperture 20, the head portion can provide a positive lock to hold the protector 10 in place.

In the embodiment illustrated, the compressibility of the head portion 32 is accomplished by providing a hollow center 34. As can be seen in FIG. 2, this hollow center 34 extends from one side of the plate 12, through the cylindrical portion 30 and into the head portion 32. This hollow center 34 extends completely through that part of the head portion 32 which is greater in diameter than the bolt aperture 20. It is this hollow center 34 which allows the flange protector 10 to be molded from fairly incompressible material while allowing the head portion to be compressible to fit through the bolt apertures. In addition, the hollow center 34 can receive a push rod for inserting the head portion 32 through bolt apertures 20.

Figure 3:
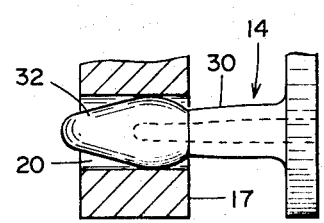
FIG. 3 is a section view of one of the attachment means showing the same partially inserted in a bolt opening in a flange.
Figure 5:
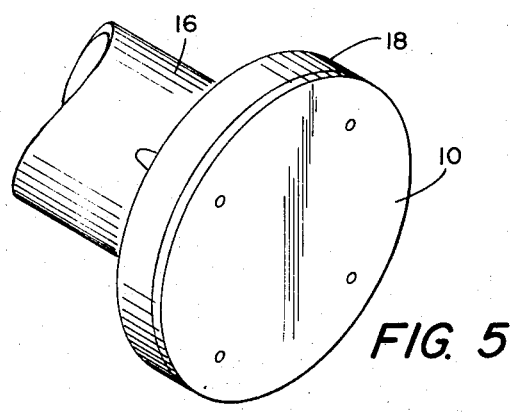
FIG. 5 is a perspective view of the improved flange protector installed on a typical flange.

In operation the flanged protector 10 is placed adjacent the flange 18 and the head portions 32 of the connectors 14 are compressed to pass through the bolt apertures 20 as shown in FIGS. 3 and 4. This can be conveniently accomplished by inserting a small diameter rigid push rod (smaller in diameter than hollow center 34) into hollow center 34 and thereafter forcing the head portion 32 through bolt aperture 20. With the protector 10 in the position shown in FIG. 5, the valve or pipe section 16 can be transported with the protector 10 covering the machined surface 24.

To remove the protector 10 from the pipe or valve section 16, the head portions 32 are severed from the connector means 14, thus allowing the protector 10 to slide off the flange 18. For example, with the protector 10 molded from a material such as reclaimed rubber, or the like, head portions 32 can be severed by a knife or by twisting or pulling action with hand pliers without requiring special equipment.

It should be understood, of course, that the foregoing disclosure relates only to a preferred embodiment of the present invention and that numerous modifications or alterations may be made therein without departing from the spirit and scope of the invention as set forth in the appended claims.

I claim:

1. A flange protector for attachment to a machined surface of a flange on a pipe or valve section, the machined surface having a plurality of bolt apertures extending therethrough, comprising:

a plate of flexible material having a shape substantially the same as the shape of the machined surface; and a plurality of connector means integrally formed on said plate and extending perpendicularly from one side of said plate for attaching said protector to the machined surface whereby said plate covers and protects said machined surface, said connector means having a first portion adjacent to said plate and a compressible head formed on the extremity of said first portion, said first portion being of a diameter less than the diameter of said bolt apertures, said head when uncompressed having a portion which has a diameter greater than said bolt apertures, a hollow center extends through said plate, said first portion, and into said head of said connector means whereby insertion of said head portions through said apertures is facilitated.

2. A flange protector for attachment to a machined surface of a flange on a pipe or valve section, the machined surface having a plurality of bolt apertures extending therethrough, comprising:

a plate of flexible material having a shape substantially the same as the shape of the machined surface; and a plurality of connector means integrally formed on said plate and extending perpendicularly from one side of said plate for attaching said protector to the machine surface whereby said plate covers and protects said machined surface, said connector means having a first portion adjacent to said plate and a compressible bulbous-shaped head formed on the extremity of said first portion, said first portion being of a diameter less than the diameter of said bolt apertures, said head when uncompressed having a portion which has a diameter greater than said bolt apertures.

3. A flange protector as defined in claim 1 wherein said greater diameter portion of said head is hollow.

4. A flange protector as defined in claim 1, wherein the length of said first portion is less than the thickness of said flange.

5. A flange protector as defined in claim 1, wherein said protector is molded from material selected from the group consisting of reclaimed rubber, polyethylene and polystyrene.

6. A flange protector for attachment to a machined portion of the flanged end of a pipe or valve section, said machined portion having a planar surface with a plurality of bolt apertures extending through said flange, an annular raised surface centrally located on said planar surface, comprising:

a plate of flexible material having an outline substantially similar to the outline of said machined portion, surface means on one side of said plate of a size and shape to contact said annular raised surface; and a plurality of connector means integrally formed on said plate and extending perpendicularly from one side of said plate for attaching said protector to said flange whereby said plate covers and protects said machined portion, said connector means being positioned on said plate corresponding to the location of said bolt apertures on said flange, said connector means having a body of a diameter less than said bolt apertures and a compressible head portion of a diameter greater than the diameter of said bolt aperture.

7. A flange protector as defined in claim 6 wherein a hollow center extends through said plate, said first portion and into said head portion of said connector means whereby insertion of said head portions through said apertures is facilitated.

8. A flange protector as defined in claim 6, wherein the length of said body is less than the thickness of said flange.

9. A flange protector for attachment to an annular-shaped machined surface on a flange of a pipe or valve section, the machined surface having a plurality of bolt apertures extending therethrough, an annular raised surface centrally located on said machined surface, comprising:
   a flat circular plate of flexible material, said plate having a circular cross section cavity on one side thereof; and
   a plurality of connector means integrally formed on said one side of said plate and extending perpendicularly therefrom for connecting said protector to said flange, each of said connector means comprising an elongated cylindrical first portion adjacent said plate, a head portion formed on the extremity of said first portion, said head portion having a first hemispherical surface extending from said first portion, said first surface being greater in diameter than said first portion, a second cone-shaped surface extending tangentially from said first surface in a diverging direction away from said first portion, a third hemispherical surface tangentially extending from the diverging end of said second surface, said third hemispherical surface having a diameter substantially smaller than said first hemispherical surface.

10. A flange protector as defined in claim 9 wherein a hollow center extends through said plate, said first portion and into said head portion of said connector means.

11. A flange protector as defined in claim 10 wherein said hollow center extends through the part of said head portion carrying said first hemispherical surface.

12. A flange protector for attachment to an annular-shaped machined surface on a flange of a pipe or valve section, the machined surface having a plurality of bolt apertures extending therethrough, comprising:
   a cylindrical flat plate of flexible material; and
   a plurality of connector means integrally formed on one side of said plate and extending perpendicularly therefrom for connecting said protector to said flange, each of said connector means comprising an elongated cylindrical first portion adjacent said plate, a head portion formed on the extremity of said first portion, said head portion having a first hemispherical surface extending from said first portion, said first surface being greater in diameter than said first portion, a second cone-shaped surface extending tangentially from said first surface in a diverging direction away from said first portion, a third hemispherical surface tangentially extending from the diverging end of said second surface, said third hemispherical surface having a diameter substantially smaller than said first hemispherical surface.

* * * * *